(12) United States Patent
Shao et al.

(10) Patent No.: US 9,914,477 B2
(45) Date of Patent: Mar. 13, 2018

(54) INDUCTIVE STEERING TORQUE AND ANGLE SENSOR

(71) Applicant: KSR IP Holdings LLC., Wilmington, DE (US)

(72) Inventors: Lingmin Shao, Ridgetown (CA); Jun Yang, London (CA); Ryan W. Elliott, Chatham (CA)

(73) Assignee: KSR IP Holdings LLC, Wilmington, DE (US)

( * ) Notice: Subject to any disclaimer, the term of this patent is extended or adjusted under 35 U.S.C. 154(b) by 0 days.

(21) Appl. No.: 15/356,770

(22) Filed: Nov. 21, 2016

(65) Prior Publication Data

US 2017/0166251 A1   Jun. 15, 2017

Related U.S. Application Data

(60) Provisional application No. 62/277,098, filed on Jan. 11, 2016, provisional application No. 62/265,687, filed on Dec. 10, 2015.

(51) Int. Cl.
*B62D 6/10*   (2006.01)
*G01L 3/10*   (2006.01)

(52) U.S. Cl.
CPC ............... *B62D 6/10* (2013.01); *G01L 3/105* (2013.01)

(58) Field of Classification Search
CPC ............ B62D 6/10; G01L 3/105; G01B 7/30

USPC ............. 73/862.331–862.338, 862.325
See application file for complete search history.

(56) References Cited

U.S. PATENT DOCUMENTS

| | | | | |
|---|---|---|---|---|
| 5,406,155 A | * | 4/1995 | Persson | G01D 5/2073 310/171 |
| 5,442,956 A | * | 8/1995 | Persson | G01D 5/2073 73/117.02 |
| 6,250,420 B1 | * | 6/2001 | Brenner | B62D 6/10 180/443 |
| 6,384,598 B1 | * | 5/2002 | Hobein | G01D 5/2046 318/654 |
| 6,520,031 B2 | * | 2/2003 | Madni | G01D 5/2053 324/207.17 |
| 7,562,591 B2 | * | 7/2009 | Lee | B62D 6/10 324/207.17 |
| 8,988,066 B2 | * | 3/2015 | Shao | G01B 7/30 324/207.16 |

* cited by examiner

*Primary Examiner* — Harshad R Patel
*Assistant Examiner* — Octavia Hollington
(74) *Attorney, Agent, or Firm* — Dinsmore & Shohl LLP

(57) ABSTRACT

A torque sensor for a steering mechanism having an input shaft joined to an output shaft by a torsion bar. A first coupler is connected to the input shaft while a second coupler is connected to the output shaft. A first and second receiving coils, each having a plurality of oppositely wound loops, are arranged adjacent the first and second coils, respectively, while a circuit determines the angular offset between the couplers.

6 Claims, 4 Drawing Sheets

INDUCTIVE STEERING TORQUE AND ANGLE SENSOR

CROSS-REFERENCE TO RELATED APPLICATIONS

This application claims priority to U.S. Patent Application No. 62/277,098, entitled "Inductive Steering Torque and Angle Sensor", filed Jan. 11, 2016, and also U.S. Patent Application No. 62/265,687, entitled "Inductive Steering Torque and Angle Sensor", filed Dec. 10, 2015.

BACKGROUND OF THE INVENTION

I. Field of the Invention

The present invention relates generally to a torque and angle sensor for a steering system.

II. Description of Related Art

In steering systems of the type used in automotive vehicles, the steering system typically includes an input shaft connected to the steering wheel. The input shaft is then connected to an output shaft through a torsion bar and the output shaft, in turn, is mechanically connected through linkage to the vehicle wheels. Consequently, rotation of the steering wheel pivots the wheels of the automotive vehicle through the torsion bar, output shaft, and steering linkage.

In many situations, it is highly desirable to determine the angular deflection between the input shaft and the output shaft of the steering mechanism. The degree of angular deflection between the input shaft and the output shaft, i.e. the angular deflection of the torsion bar, is then utilized by the vehicle management system to detect the applied steering wheel torque and then to determine the appropriate amount of assist provided by the power steering for the vehicle. For example, rotation of the vehicle if stopped or nearly stopped, e.g. a vehicle parking situation, typically creates a relatively high angular deflection between the input shaft and output shaft thus calling for increased power systems for turning the vehicle wheels. This deflection, furthermore, rarely exceeds 20 degrees.

Previously, inductive sensors have been used in connection with the steering mechanism to determine the angular deflection of the steering wheel torsion bar. In these previously known inductive sensors, a first conductive coupler is attached to one end of the torsion bar while a second conductive coupler is attached to the other end of the torsion bar. A PCB is then attached to the vehicle frame and positioned in between the two couplers.

The PCB has two sets of receiving coils. One set of receiving coils cooperates with the first coupler while, conversely, the second set of receiving coils operates in conjunction with the second coupler. Each receiving coil, furthermore, comprises a plurality of circumferentially adjacent, oppositely wound coils so that, when excited by a high frequency signal, the voltage output from each receiver coil will vary depending upon the angular position of its associated coupler.

One disadvantage of these previously known inductive sensors, however, is that the two inductive position sensors in the same area interfere with each other since they are both subjected to the same electromagnetic field. The output of each angular position sensor thus becomes a mixture of the signal from both positions of the couplers. In that event, it is difficult to extract the torsion angle from the two outputs from the receiver coils.

In order to minimize the interference between the two inductive sensors in the same area, there have been previously known attempts to differentiate the period of the two receiver coils. This, however, required additional computing resources since the mixed signals must be decoupled by certain algorithms.

In addition to the angular deflection between the input shaft and the output shaft of the steering mechanism, in many situations it is desirable to know the angular position of the vehicle wheels. Since the steering wheel typically can completely rotate multiple revolutions, it is necessary to keep track of the revolution count in order to determine the absolute angular position of the steering wheel and thus the absolute angular position of the vehicle wheels.

SUMMARY OF THE PRESENT INVENTION

The present invention provides both a torque and angle sensor which overcomes the above-mentioned disadvantages of the previously known sensors.

In brief, in the torque sensor of the present invention, as before, one conductive coupler is attached to one end of the torsion bar while a second conductive coupler is attached to the opposite end of that torsion bar. Consequently, both conductive couplers rotate along with the rotation of the steering wheel.

A stationary PCB is then secured to the vehicle frame and positioned in between the two conductive couplers. The PCB includes a first receiving coil that is associated with the first coupler and a second receiving coil that is associated with the second coupler. As before, each receiving coil includes a plurality of circumferentially adjacent and oppositely wound coils. Consequently, when excited by a high frequency RF source, the voltage output from each receiving coil will vary as a function of the position of its associated coupler. The appropriate circuitry can then determine the angular deflection between the two couplers, and thus the torque applied to the steering wheel, through circuitry which utilizes the two voltage outputs from the two receiver coils from the two sensors as input signals.

In order to minimize the electrical interference between the two receiver coils and thus the two sensors, the two receiving coils are constructed on the PCB on a different diameter so that the receiving coil associated with the first coupler does not overlap the receiving coil associated with the second coupler.

Consequently, the first coupler operates within a first radial zone which contains both the first coupler as well as the first receiving coil or sensor. Conversely, the second coupler as well as the second receiving coil or sensor is positioned radially outwardly from the first coupler in a second annular zone.

In order to further electrically isolate the two sensors from each other, a ferrite sheet underlies both sensors on both sides of the PCB. The ferrite sheet acts as a magnetic shield which effectively eliminates interference between the two sensors.

The present invention also provides an angle sensor which provides the absolute rotational angle of the steering wheel mechanism. In order to implement the angle sensor, a first gear wheel is attached to the first coupler so that the first coupler and first gear wheel rotate in unison with each other. The first gear wheel meshes with a second gear that is rotatably mounted relative to the PCB at a parallel hut spaced apart axis from the steering wheel torsion bar. A coupler is mounted to the second gear wheel and cooperates with the receiving coil of a third inductive sensor formed on the PCB. A Hall effect sensor, or any other type of sensor such as inductive Hall or (G)MR sensor, can be used to determine the angle of the second gear.

The first gear wheel has a number of teeth T1 while the second gear wheel has a number of teeth T2. T2=K*N, T1=K*N1 where K is an integer number. The greatest common divisor of N and N1 is 1 so that the gear pair, i.e. the first and second gear wheels, only repeat after N turns.

The first sensor has a P1 periodic structure so that its output repeats P1 times in one revolution. The third sensor has a P2 periodic structure so that, with the coupler attached to the second gear wheel, the output sensor repeats P2 times in one revolution.

Consequently, the difference of outputs from the third and first sensor forms a monotonic function so that the output difference can be used as the coarse resolution angle of the first rotor. The fine resolution angle can then be derived from the coarse resolution angle by the first sensor.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF PREFERRED EMBODIMENTS OF THE PRESENT INVENTION

Figure 1:
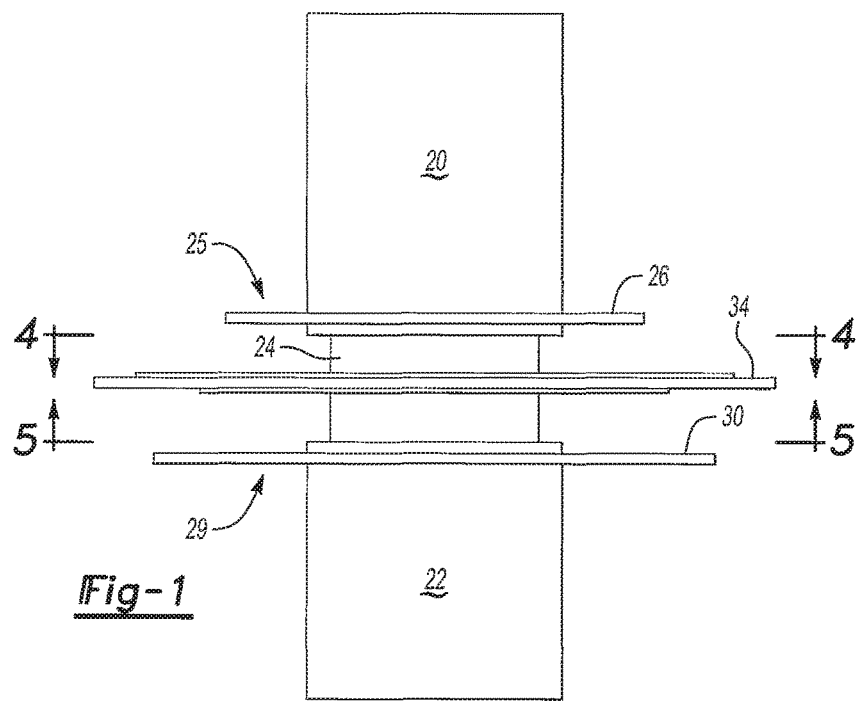
FIG. 1 is a side diagrammatic view illustrating the torque sensor of the present invention.

With reference first to FIG. 1, a portion of a steering wheel mechanism of the type used in automotive vehicles is shown. The steering wheel mechanism includes an input shaft 20 which is attached to the steering wheel for the vehicle. An output shaft 22 is coaxial with the input shaft 20. The output shaft 22 is connected to the steering linkage for the vehicle to provide the actual pivoting of the vehicle wheels.

The input shaft 20 and output shaft 22 are connected together by a torsion bar 24. This torsion bar 24 permits a limited amount of angular deflection between the input shaft 20 and the output shaft 22 depending upon the torque applied to the steering wheel. Typically, the angular deflection between the input shaft 20 and output shaft 22 rarely exceeds 20 degrees and more typically is in the range of 10 degrees or less.

Figure 2:
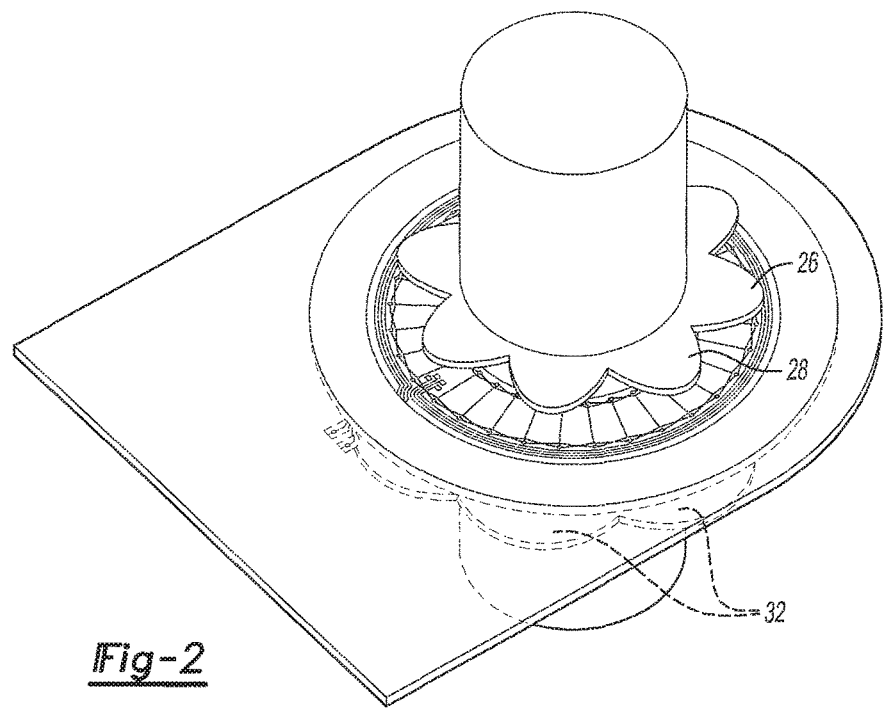
FIG. 2 is an elevational view illustrating the torque sensor.

With reference now to FIGS. 1 and 2, a first inductive sensor 25 includes a first electrically conductive rotor or coupler 26 is attached to the input shaft 20 adjacent the torsion bar 24 so that the coupler 26 and input shaft 20 rotate in unison with each other. This coupler 26, furthermore, includes a plurality of circumferentially adjacent lobes 28 best shown in FIG. 2.

Similarly, a second inductive sensor 29 includes a second conductive rotor or coupler 30 is attached to the output shaft 22 adjacent the torsion bar 24 so that the second coupler 30 rotates in unison with the output shaft 22. The second coupler 30 also includes a plurality of circumferentially adjacent lobes 32 (FIG. 2). Furthermore, the diameter of the second coupler 30 exceeds that of the first coupler 26 so that the lobes 28 of the first coupler 26 are positioned in a first zone while the lobes 32 of the second coupler are positioned in a second zone spaced radially outwardly from the first zone. As such, the lobes 28 of the first coupler 26 do not overlap the lobes 32 of the second coupler 30.

Figure 3:
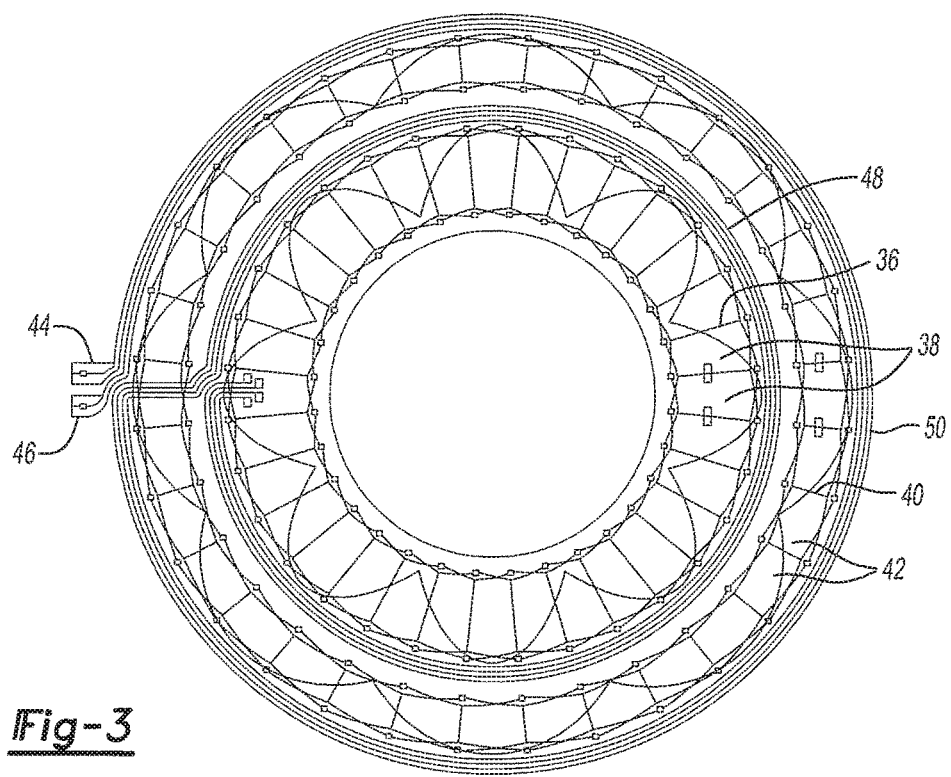
FIG. 3 is a plan view illustrating the receiving and excitation coils for the first and second sensors.

With reference now to FIGS. 1-3, a PCB 34 attached to the vehicle frame is positioned in between the two couplers 26 and 30 so that the PCB 34 is generally parallel to both couplers 26 and 30. A first sensor receiving coil 36 is provided in the first zone on the PCB 34 so that the first receiving coil 36 faces the first coupler 26. This receiving coil 36 includes a plurality of oppositely wound and circumferentially adjacent loops 38 which are electrically connected in series with each other.

Similarly, a second sensor receiving coil 40 is also positioned on the PCB 34 facing the second coupler 30. This second sensor receiving coil 40 also includes a plurality of circumferentially adjacent oppositely wound loops 42 which are electrically connected in series with each other.

The receiving coils 36 and 40 are available at outlet terminals 44 and 46, respectively, on the PCB 34. These electrical terminals are connected as input signals to ASICs also mounted on the PCB 34.

Referring now particularly to FIG. 3, a first excitation or transmitter winding 48 is mounted on the PCB 34 so that the excitation winding 48 surrounds the first sensor receiver coil 36. Similarly, a second excitation or transmitter coil 50 is also formed on the PCB 34 around the second sensor coil 40. Consequently, when the excitation coils 48 and 50 are excited with a high frequency source, preferably at different frequencies, a voltage is induced in the sensor receiving coils 36 and 40. The actual voltage of the output signal at the terminals 44 and 46 will vary as a function of the position of the associated couplers 26 and 30 relative to their associated receiving coils 36 and 40, respectively.

Figure 4:
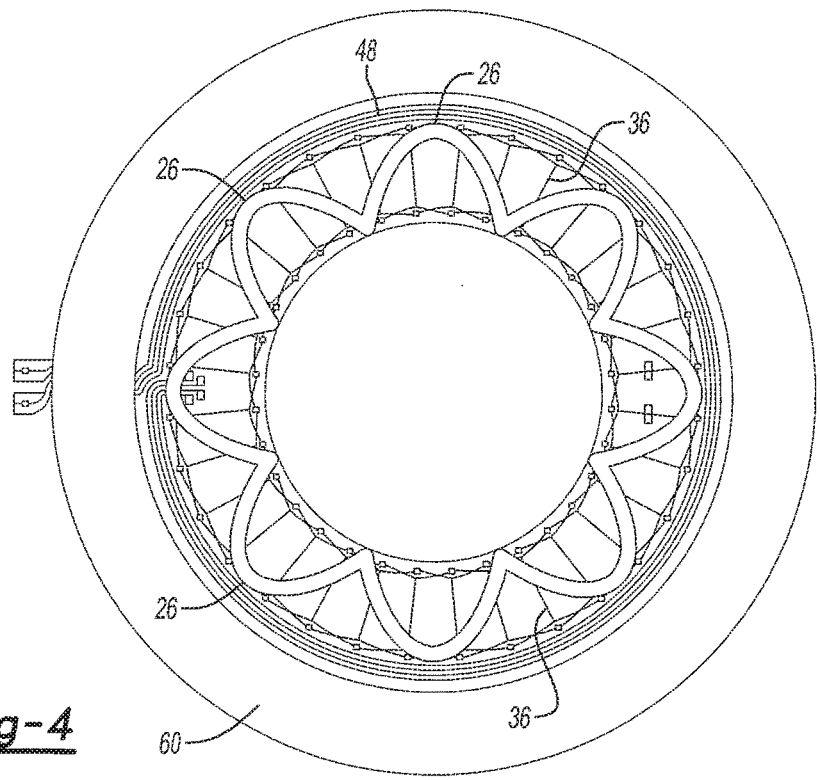
FIG. 4 and FIG. 5 are top and bottom views taken respectively along lines 4-4 and 5-5 in FIG. 1.
Figure 5:
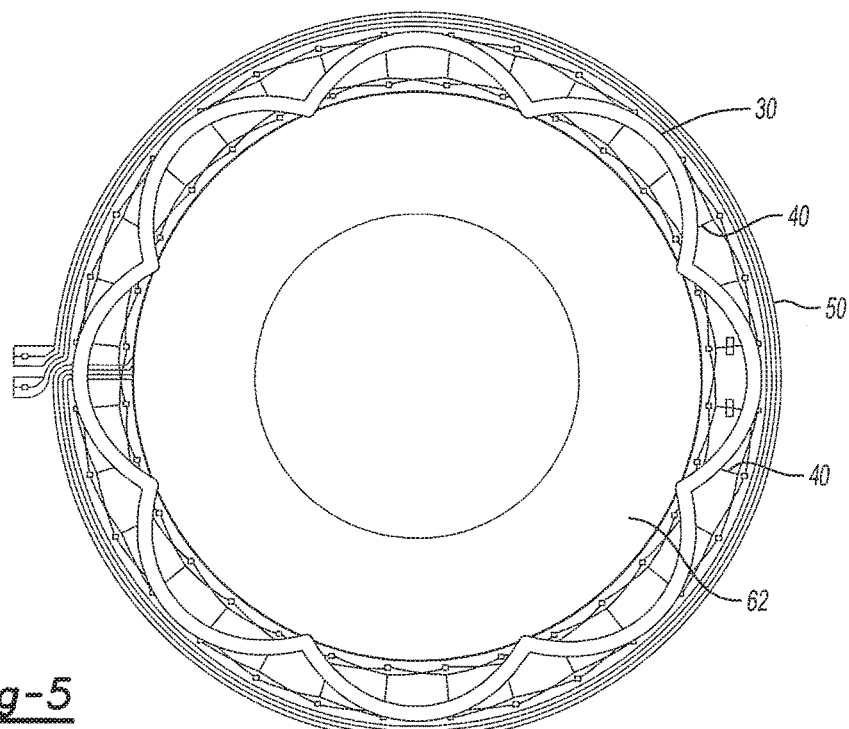

With reference now to FIGS. 4 and 5, in order to minimize the electrical interference between the two sensors, a ferrite sheet 60 is positioned on the PCB 34 under the first sensor coil 36 and its associated excitation coil 48 and coupler 26. Similarly, on the opposite side of the PCB 34, a second ferrite sheet. 62 is provided under the second coupler 30, the second sensor coil 40, and its associated excitation coil 50.

In practice, the ferrite sheets 60 and 62 magnetically isolate the two sensors from each other thus eliminating, or at least minimizing, interference between the two sensors. This, in turn, not only provides a more reliable signal but also reduces the computational complexity required in order to process a signal from the two sensors.

In practice, the output signals from the two sensor coils 40 and 36 may be processed by electronic circuitry, such as ASICs, to determine the angular deflection between the two couplers 26 and 30. This angular deflection is directly related to the torsion applied to the steering wheel. However, the outputs from the two sensor receiving coils 36 and 40 cannot provide the absolute angular rotational position of the steering wheel.

Figure 6:
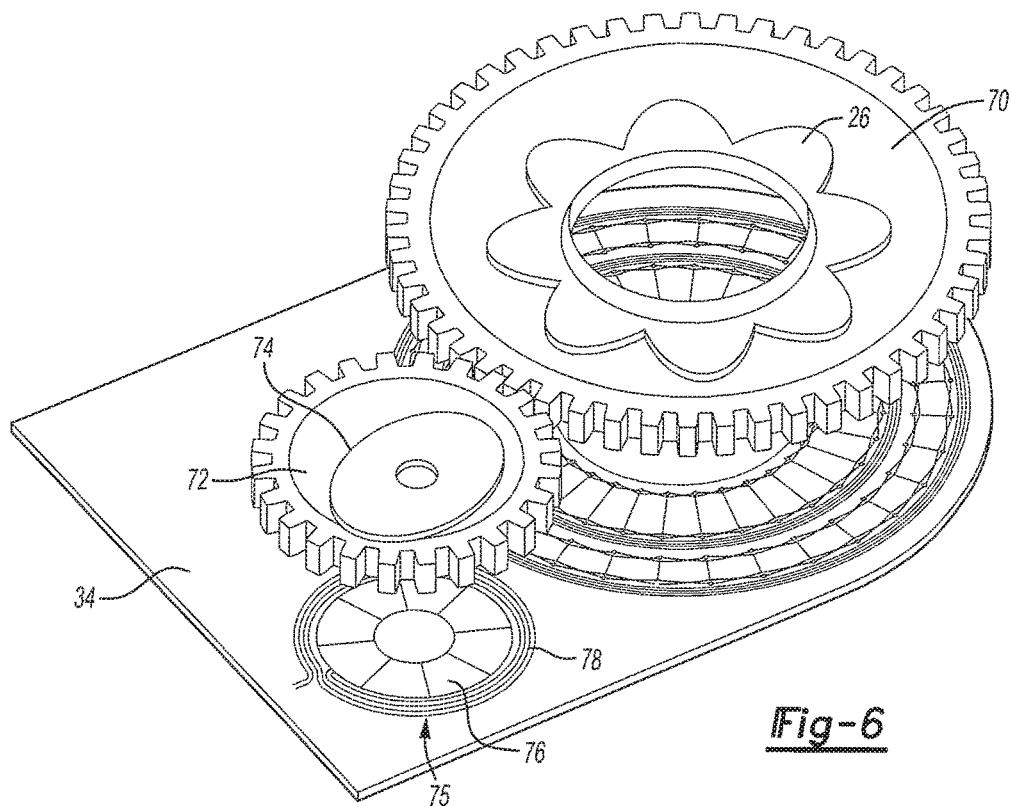
FIG. 6 is a view similar to FIG. 2, but illustrating an angle sensor.

With reference then to FIG. 6, in order to determine the absolute angular rotational position of the steering wheel, a first gear 70 having a number of teeth T1 is attached to the input shaft 20 so that the gear 70 rotates in unison with the input shaft 20. This gear 70, furthermore, meshes with a second gear 72 having T2 teeth. The second gear 72 is mounted above the PCB 34 and rotates about an axis parallel to, but radially spaced from, the axis of rotation of the input shaft 20.

Assume that T2=K*N and T1=K*N1 where K is art integer number. The number of teeth on the gear wheels 70 and 72 are selected so that the greatest common divisor of N and N1 is 1 so that the gear pair only repeats after N turns.

A conductive coupler 74 is attached to and rotates in unison with the gear wheel 72. This conductive coupler 74 cooperates with a third sensor coil 76 on the PCB 34 of a third sensor 75. The third sensor coil 76, as with the other inductive sensors 25 and 29, includes circumferentially adjacent loops which alternate between clockwise and counterclockwise direction from each other. An excitation coil 78 is also mounted to the PCB 34 to excite the third receiver coil 76.

Figure 7A:
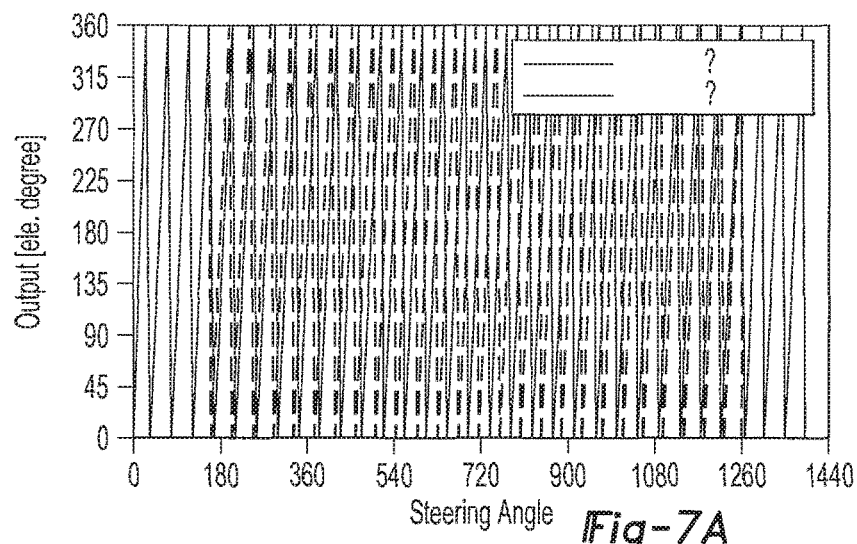
FIGS. 7A-7C are all graphs illustrating the operation of the angle sensor.

The first sensor, i.e. the sensor associated with the coupler 26, has a P1 periodic structure. As such, its output repeats P1 times for each revolution. The third sensor 75 has a P2 periodic structure so that its output from the receiver coil 76 repeats P2 times during each revolution of the gear wheel 72 and thus of the coupler 74. Consequently, the signals from the first sensor 25 and third sensor 75 overlap only after a predetermined number of revolutions. The outputs from the first sensor and third sensor 75 are shown in FIG. 7A.

Figure 7B:
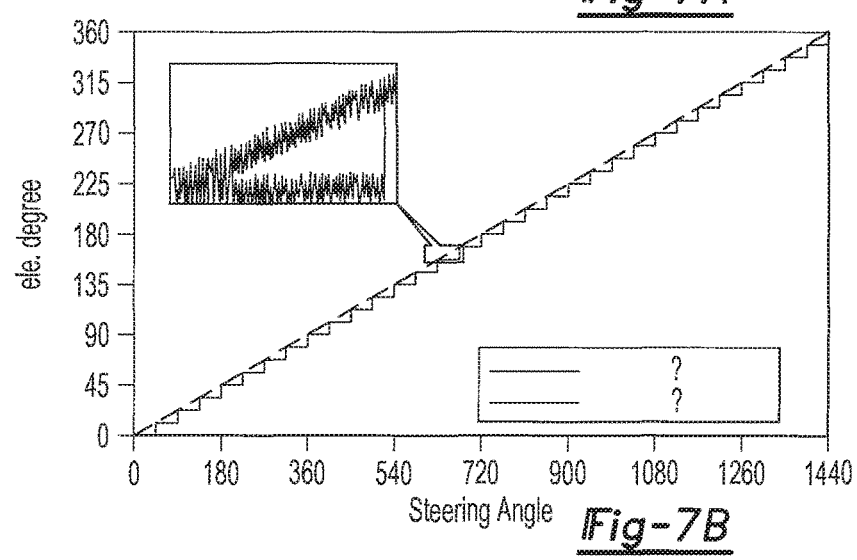

In order to find the absolute rotational position of the steering wheel, let M=abs(N2*P2−N*P1). This produces a monotonic function within N/M turns of rotation and cart be used as coarse resolution angle of the first coupler 26 within N/M rotations. This relationship is shown in FIG. 7B.

Thereafter, the fine resolution M can be determined from the coarse resolution angle (FIG. 7B) as well as the sensor angle from the first sensor. This relationship is illustrated in FIG. 7C for four rotations of the steering wheel.

In operation, the first sensor 25 measures the angle within one 360/P1 degree segment and the third sensor 75 and the third sensor together determine which segment the first segment is in. Consequently, this allows large backlash between the gears without mixing the segment number as shown in FIG. 7B so that gear backlash does not introduce error into the steering angle sensor.

Although the angle sensor has been described for use with an inductive torque sensor, it will be understood, of course, that other types of torque sensors may be used in conjunction with the angle sensor without deviation from the scope or spirit of the invention. For example, a moving magnet torque sensor, such as those designed by Moving Magnet Technologies SA, may be used in lieu of the inductive sensor. In a moving magnet sensor a band or yoke of alternating magnet segments are attached to the rotating steering column while magnetic stators are attached to opposite ends of the torsion bar. These stators vary the magnetic field between the stators and magnetic as a function of the angular displacement, and thus the torque, between the stators. These magnetic variations are then detected by a stationary Hall effect sensor having its output connected to a circuit, such as an ASIC, which computes the torque from the Hall effect sensor output. The alternating magnetic segments of the yoke can form a multipole angle sensor to a stationary reference that can be substituted for the multipole inductive sensor on the primary shaft.

Figure 7C:
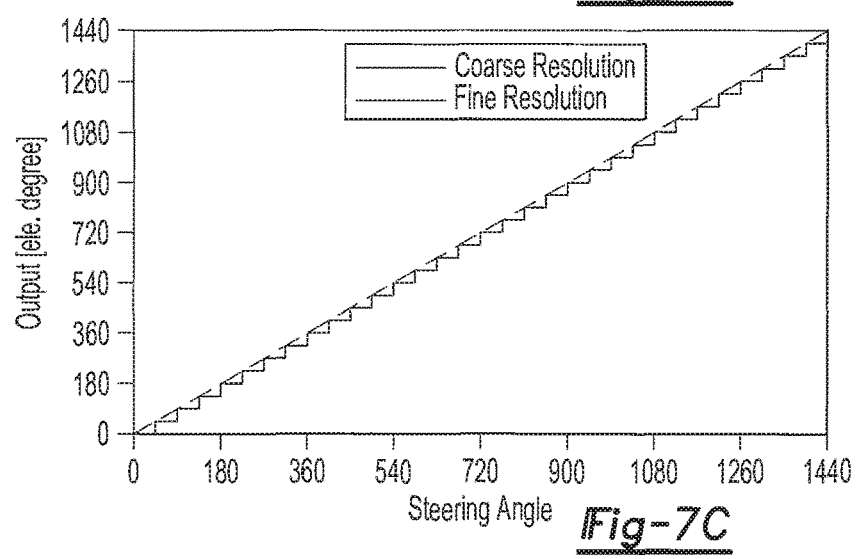

With reference to FIGS. 7A-7C, FIG. 7A is a graph illustrating the raw output angle for the gear 74 (FIG. 6) on the Y axis verses the steering angle on the X axis for multiple rotations of the steering wheel. FIG. 7B illustrates the backlash for the gear 74 as a function of rotation of the steering wheel through multiple rotations. FIG. 7C is a graph of the output from the sensor as a function of rotation of the steering wheel.

Still other types of sensors may alternatively be used.

From the foregoing, it can be seen that the present invention provides a novel torque and angle sensor for use with the steering mechanism for automotive vehicles. Having described our invention, however, many modifications thereto will become apparent to those skilled in the art to which it pertains without deviation from the spirit of the invention as defined by the scope of the appended claims.

We claim:

1. A torque sensor for a vehicle having a frame comprising:
   an input shaft,
   an output shaft aligned with said input shaft,
   a torsion bar which mechanically connects said input shaft and output shaft together,
   a first electrically conductive coupler connected to said input shaft so that said first coupler rotates in unison with said input shaft,
   a second electrically conductive coupler connected to said output shaft so that said second coupler rotates in unison with said output shaft,
   a first receiving coil having a plurality of oppositely wound and circumferentially spaced receiving loops connected in series with each other and attached against movement to the frame so that said first coupler overlies said first receiving coil,
   a second receiving coil having a plurality of oppositely wound and circumferentially spaced receiving loops connected in series with each other and attached against movement to the frame so that said second coupler overlies said second receiving coil,
   at least one transmitter winding which excites said receiving loops at a preselected frequency,
   a circuit which receives a signal from both said first receiving coil and said second receiving coil and generates an output representative of an angular offset and torque between said input shaft and said output shaft.

2. The invention as defined in claim 1 further comprising a ferrite layer disposed between said receiving coils.

3. The invention as defined in claim 1 wherein said first receiving coil and said second receiving coil are radially spaced from each other.

4. The invention as defined in claim 1 wherein said at least one transmitter winding comprises a first transmitter winding which excites said first receiving coil and a second transmitter winding which excites said second receiving coil.

5. The invention as defined in claim 1 further comprising means for determining the number of revolutions of said input shaft relative to a starting position including a sensor.

6. The invention as defined in claim 1 wherein said input and output shafts rotate relative to said first and second receiving coils.

* * * * *